United States Patent
Rother et al.

(10) Patent No.: US 8,019,177 B2
(45) Date of Patent: Sep. 13, 2011

(54) IMAGE BLENDING

(75) Inventors: Carsten Rother, Cambridge (GB); Vladimir Kolmogorov, Cambridge (GB); Andrew Blake, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 899 days.

(21) Appl. No.: 11/997,033

(22) PCT Filed: Jul. 28, 2006

(86) PCT No.: PCT/US2006/029326
§ 371 (c)(1), (2), (4) Date: Jan. 28, 2008

(87) PCT Pub. No.: WO2007/016301
PCT Pub. Date: Feb. 8, 2007

(65) Prior Publication Data
US 2009/0129700 A1 May 21, 2009

(30) Foreign Application Priority Data
Jul. 28, 2005 (EP) .................................. 05254745

(51) Int. Cl.
*G06K 9/36* (2006.01)
(52) U.S. Cl. ..................................................... 382/284
(58) Field of Classification Search .................. 382/276, 382/284, 162, 199; 715/502, 521, 523, 526, 715/528, 714, 788, 790, 798; 700/239
See application file for complete search history.

(56) References Cited

U.S. PATENT DOCUMENTS

| 5,870,103 | A | 2/1999 | Luo |
| 6,912,293 | B1 * | 6/2005 | Korobkin ............ 382/100 |
| 7,292,255 | B2 * | 11/2007 | Doan et al. ............ 345/629 |
| 2004/0165788 | A1 | 8/2004 | Perez et al. |

OTHER PUBLICATIONS

Agarwala et al., "Interactive Digital Photomontage", ACM-Transaction on Graphics, vol. 3, No. 23, Aug. 2004, pp. 294-302.
Blake et al., "Interactive Image Segmentation Using an Adaptive GMMRF Model", Proceedings 8th European Conference on Computer Vision, May 11-14, 2004, pp. 428-441.
Levin et al., "Seamless Image Stitching in the Gradient Domain", Proceedings 8th European Conference on Computer Vision, May 11-14, 2004, pp. 377-389.

\* cited by examiner

*Primary Examiner* — Yon Couso
(74) *Attorney, Agent, or Firm* — Lee & Hayes, PLLC

(57) ABSTRACT

Previously, Poisson blending has been used for image blending including cloning an object onto a target background and blending pairs of source images together. Such Poisson blending works well in many situations. However, whilst this method is always workable, we have found that discolorations sometimes occur. We realized that these discolorations occur when the gradient of the source image is preserved too insistently, at the expense of preserving object and background color. In some situations object outlines become smeared or blurred. We develop a color preservation term and a fragility measure to address these problems. This gives a user additional control to obtain smooth compositions and reduce discoloration artifacts.

18 Claims, 6 Drawing Sheets

IMAGE BLENDING

CROSS-REFERENCE TO RELATED APPLICATIONS

This US application claims priority from European Patent Application No. 05254745.2 filed on Jul. 28, 2005 and entitled "Image Blending" and also claims priority to International Application No. PCT/US2006/029326 filed Jul. 28, 2006 and entitled "Image Blending" which is incorporated herein by reference.

TECHNICAL FIELD

This description relates generally to image editing and more specifically to blending an image.

BACKGROUND

Image processing tools such as Microsoft's Digital Image Suite (trademark), Adobe Photoshop (trademark) and Illustrator (trademark) are known and there is an increasing demand for such tools both in the domestic and professional markets. One common task carried out using such tools is to paste a piece of one image into another image or into other locations of the same image. This type of operation is useful for correcting, repairing or modifying digital images such as digital photographs as well as for creating photo-montage. However, several problems arise including the fact that seams are typically introduced between the edited region and the rest of the original image. Image blending is therefore required in order to minimize the appearance of such seams. In addition, it is required to simplify the actions needed by the user in order to operate the image processing tools as well as to provide a tool that operates quickly and effectively.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Previously, Poisson blending has been used for image blending including cloning an object onto a target background and blending pairs of source images together. Such Poisson blending works well in many situations. However, whilst this method is always workable, we have found that discolorations sometimes occur. We realized that these discolorations occur when the gradient of the source image is preserved too insistently, at the expense of preserving object and background color. In some situations object outlines become smeared or blurred. We develop a color preservation term and a fragility measure to address these problems. This gives a user additional control to obtain smooth compositions and reduce discoloration artifacts.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

In our earlier U.S. patent application Ser. No. 10/417,937 filed on Apr. 16, 2003, Published as US 2004/0165788 A1 and also assigned to Microsoft Corporation, we describe a method of image blending referred to herein as Poisson blending (and also as Poisson editing). Such Poisson blending works well in many situations. Whilst this method is always workable, we have found that there is a potential for discolorations. We realized that these discolorations occur when the gradient of the source image is preserved too insistently, at the expense of preserving object and background color. Another problem is that object outlines become smeared or blurred in many situations. The present invention seeks to address these problems by extending and building on the Poisson blending technique. In addition, it is sought to eliminate or minimize artificial seams along stitch boundaries between parts of images in a composite image.

Poisson editing is described both in our earlier patent application referenced above and also in Perez et al. 2003 "Poisson image editing." ACM Trans. Graph. 22, 3, 313-318. It is also now described here.

Poisson editing is simply expressed as an optimization over the constructed image u(r), r∈S that matches its gradient ∇u most closely to the source gradient $\nabla I_S$, subject to 1 matching the target image $I_T(r)$ on the boundary of S. This is written as the minimization of the functional $$E(u)=\int_{r \in S}\|\nabla u - \nabla I_S\|^2$$

subject to the condition that u is continuous, and to the boundary condition that $u(r)=I_T(r)$ for r on $\partial S$ The gradient matching term approximates a physical "membrane", as if the reconstructed image u is generated by stretching a membrane over the source image $I_S$, but forced also to agree with the target image on the boundary $\partial S$. The minimization can be solved exactly by variational calculus to give a Poisson equation $\nabla^2 u = \nabla^2 I_S$, subject to the Dirichlet conditions, giving rise to the term "Poisson" blending.

Figure 3:
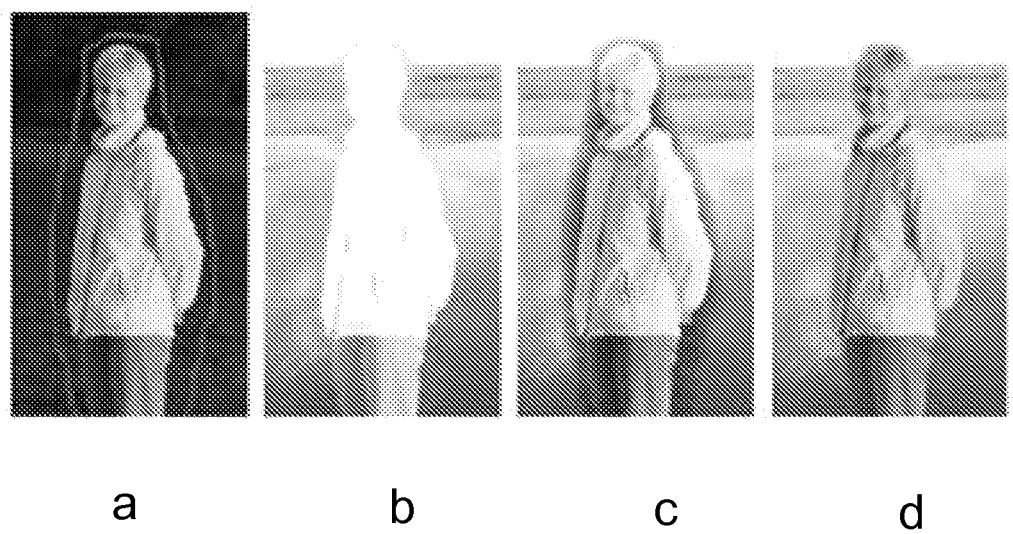
FIG. 3a shows a source image of an object for cloning.
FIG. 3b shows the result of cloning the object of FIG. 3a onto a target background using a prior art blending method.
FIG. 3c shows the result of cloning the object of FIG. 3a onto the same target background as for FIG. 3b using a blending method incorporating a color preservation term.
FIG. 3d shows the result of cloning the object of FIG. 3a onto the same target background as for FIG. 3b using a blending method incorporating both the color preservation term of FIG. 3c and a measure of a degree of contrast in the source image.

While Poisson blending is often effective, we have found that there are circumstances where it fails. For example, consider the source image of FIG. 3a comprising an object to be cloned onto a target image. The source image comprises a portrait of a person 30 standing against a dark background 31. A line 32 has been roughly drawn around the person in order to indicate the region of the source image that is to be cloned. The term "cloning" is used to refer to situations in which it is required to paste an object, or part of an object, from a source image into a destination image. The line 32 is, for example, inserted by a user using a drawing tool or lassoing tool in an image processing application. The line is drawn such that some of the dark background of the source image is included in the region to be cloned. It is very difficult to avoid including this background without painstaking work by the user or by using an automatic segmentation algorithm. However, such segmentation algorithms are complex, time consuming and difficult to use by novice users.

FIG. 3b shows the result of cloning the selected region in the source image (FIG. 3a) onto a target image using the prior art Poisson editing method taught in our earlier patent application mentioned above. The target image is much lighter than the background in the source image (FIG. 3a) and it can be seen that the cloned source material is discolored or lightened inappropriately. In addition there are problems with smearing of the object outline or edges in the constructed image.

Figure 1:
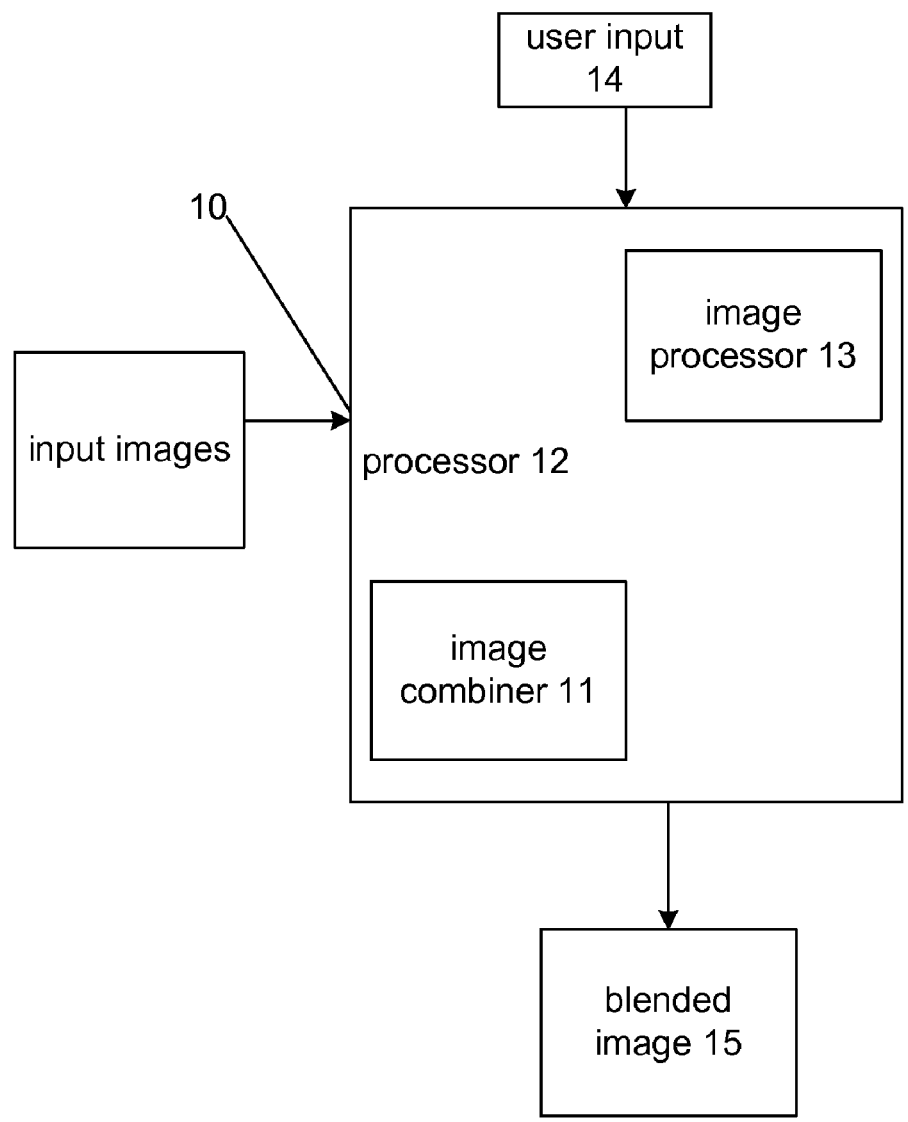
FIG. 1 is a high level schematic diagram of an image blending system.

FIG. 1 is a high level schematic diagram of an apparatus for image blending. It comprises in input 10 for receiving one or more input images and an output 15 for outputting a blended image. The apparatus comprises an image combiner 11 arranged to combine the input images (or at least part of those images) to create a composite image. A processor 12 either automatically determines a boundary in the composite image or uses received user input 14 to assist in identifying this boundary. The boundary is between a region in the composite image formed from one of the source images and a region in the composite image formed from another of the source images. An image processor 13 is also provided which is arranged to modify the composite image according to a modified Poisson editing method as described herein. The processor 12, image combiner 11 and image processor 13 may be separate entities or may be combined on a single computing system.

Figure 2:
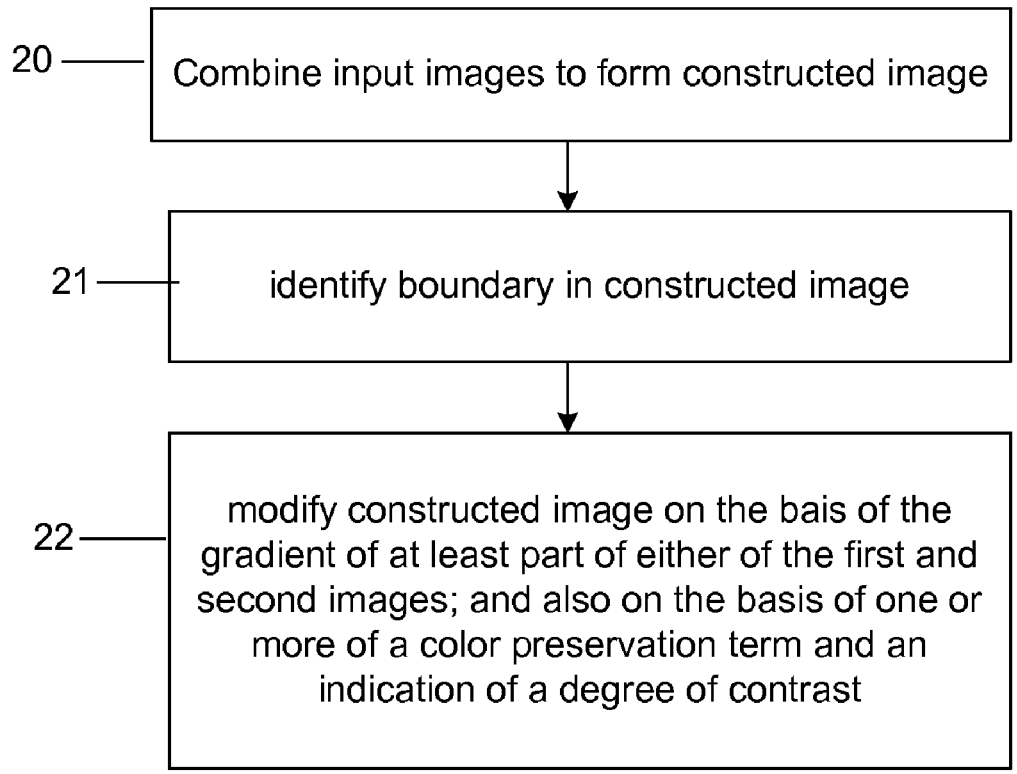
FIG. 2 is a high level flow diagram of a method if image blending.

FIG. 2 is a high level flow diagram of a method of blending a first image and a second image to form a constructed image using the apparatus of FIG. 1. The method comprises the steps of:
  combining at least part of the first image and at least part of the second image to form the constructed image (see box 20 of FIG. 2);
  identifying a boundary in the constructed image being between a region in the constructed image formed from the first image and a region in the constructed image formed from the second image (see box 21 of FIG. 2);
  modifying the constructed image on the basis of the gradient of at least part of either of the first and second images (see box 22 of FIG. 2); and wherein said modification is also carried out on the basis of one or more of: a color preservation term and an indication of a degree of contrast in at least one of the first and second images.

In order to address the problem of discoloration we have developed a color preservation term as now described in more detail. In addition we have developed use of an indication of degree of contrast in at least one of the first and second images in order to reduce smearing of object outlines.

We therefore modified the functional E(u) used in pure Poisson editing as mentioned above, to include a color preservation term. The functional E(u) then becomes:

$$E(u)=\int_S (u-I_S)^2 + \lambda^2 \|\nabla u - \nabla I_S\|^2,$$

This functional is then minimized with respect to continuous u(r), r∈S subject to the boundary conditions mentioned above. The effect of the color preservation term is to introduce a tendency for cloned material to retain the source color, and this tendency competes against the preference for agreement with the source gradient.

A weighting parameter is introduced $\lambda$ in the equation above. This controls the trade off between the tendency to retain the source color and the tendency for agreement with the source gradient. In practice, useful values of this weighting parameter typically range between about 5 pixels and 200 pixels.

FIG. 3c shows the result of using the color preservation term to modify the Poisson editing method for the same source and target images as for FIGS. 3a and b. There is a marked improvement in object color which now tends to be preserved. Whilst this method is completely workable, and advantageous in many situations, we have found that background discoloration can remain in some situations. For example, see FIG. 3c. We identified that this discoloration of the background occurs because the gradient term of the functional E(u) operates around object outlines to preserve the same degree of contrast as in the source image, even though the new target background demands a change of contrast. In another embodiment of the invention we address this issue by using a measure of the degree of contrast in the source image.

We introduce a "fragility" term in the cost E to disable the gradient constraint on object outlines. This term can be considered as reducing the tension in the membrane where there is high contrast in the source image. This acts as a form of implicit or "soft" detection of edges. The functional E(u) now has a modified gradient term:

$$E(u)=\int_S (u-I_S)^2 + \lambda^2 \int_S w_S(\nabla I_S) \|\nabla u - \nabla I_S\|^2$$

Where fragility, $w_S$ is $$w_S(\nabla I_S) = \varepsilon + \exp\left(-\frac{1}{2g_S}\|\nabla I_S\|^2\right)$$

With $g_S = \langle \|\nabla I_D\|^2 \rangle_S$

Subject to the boundary conditions as before. Here < ... > denotes a mean value over the domain S; $\varepsilon$ is a small constant, whose value is uncritical but typically $\varepsilon=0.02$, just to prevent occasional excessive sharpening of edges. The method has the effect that $w_S(\ldots)$ falls from 1 to a low value wherever there are unusually high levels of gradient $\|\nabla I_S\|$ This tends to disable the tendency of Poisson Editing to preserve image gradient, even on object outlines. In this way, image contrast at object boundaries is encouraged to adapt appropriately to the new target.

Compared with Poisson editing, both foreground and background colors tend to be more faithfully reproduced as illustrated in FIG. 3d which shows the result of image blending using the functional mentioned immediately above for the same source and target images as for FIGS. 3b and 3c. Another advantage is that by using the parameter λ, it is possible to control the degree to which target background is allowed to diffuse into the cloned area. This parameter can be linked to user input such that a user is able to specify exact values of the parameter or use a sliding input control for example, to increase or decrease the current value of the parameter used. In this way the user is able to use trial and error to find his or her preferred subjective balance between smoothness and faithfulness of color. User adjustment of λ can be done in real time as described in more detail below.

Figure 6:
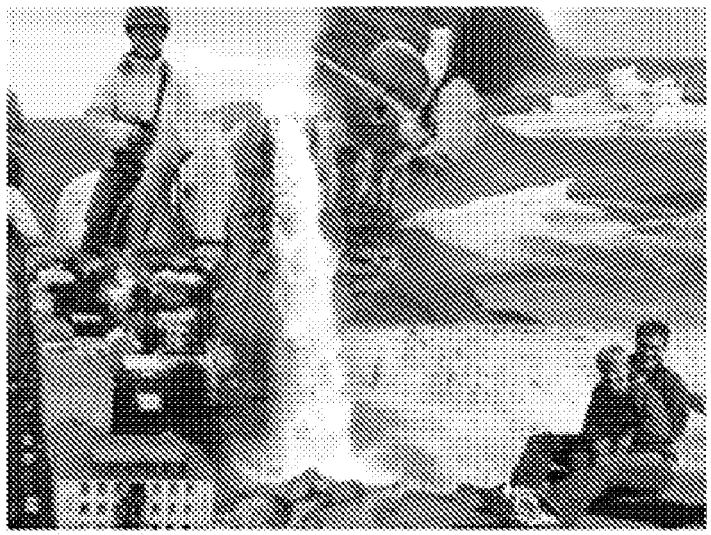
FIG. 6 shows a composite image formed by blending six source images using a method of the present invention.

In the examples described above with respect to FIG. 3 an image of a person is cloned onto a background target image. The invention also encompasses image blending in which two or more images are used to form a composite image. For example, FIG. 6 shows a composite image formed from six source images using an embodiment of the present invention.

Image stitching aims to blend together pairs of source images which are already similar in the most seamless possible way. For example, for photo montage, image tapestry, or forming any suitable type of composite image. This can be achieved elegantly by minimizing a mismatch functional along the stitch boundary as described in Kwatra et al. 2003 "Graph cut textures; image and video synthesis using graph cuts." ACM Trans. Graph. 22, 3, 227-286. However, it is still required in many situations to blend two images which are generally very different and for which a good match along the boundary is not available. Graph cut methods such as that proposed by Kwatra (mentioned above) do not deal with this type of situation. In such cases, a known approach has been to position the seam close to high contrast boundaries where it is less visible to viewers. That is, in this case, the step of identifying a boundary (see box 21 of FIG. 2) comprises positioning that boundary close to high contrast boundaries where possible. This can be achieved through user input or by calculation. For example, a modified functional for this problem, is taught in the Kwatra paper mentioned above. It introduces a gradient-magnitude dependency that tends to steer the seam close to high contrast boundaries. However, the drawback with this approach is that, In general, the seam cannot follow entirely along lines of high contrast and is obtrusively visible along the remaining parts of its length. We recognized this problem and have identified a method of dealing with it. The term that we introduce in the functional E(u) in order to modify the constructed image on the basis of an indication of the degree of contrast in the source image allows us to inhibit blending along lines of high contrast. That is, our blending process enables blending to be applied with the special property that it occurs along the obtrusive part of a seam and is inhibited along lines of high contrast. The use of the color preservation term is not essential for this method however; that is, the color preservation term is not needed to inhibit blending along lines of high contrast whilst allowing blending to occur at other locations along the seam or boundary.

Figure 4:
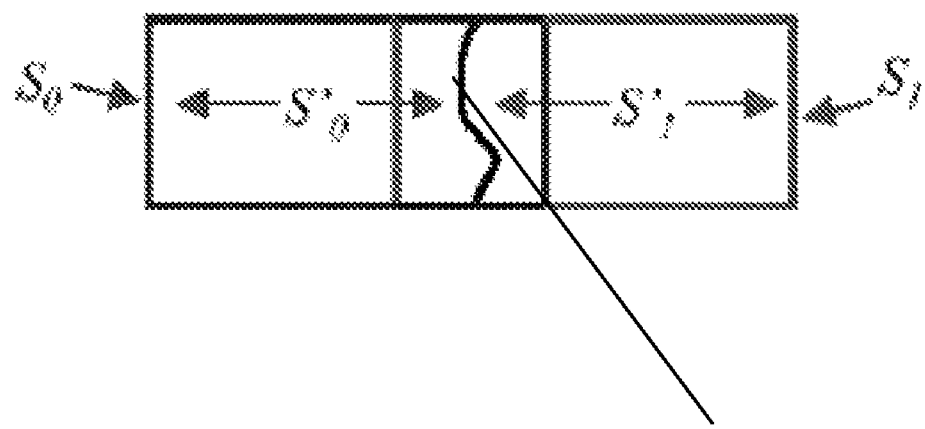
FIG. 4 shows two source image regions to be blended together.

FIG. 4 shows two partially overlapping source image regions $S_0$ and $S_1$ that are to be blended together to form a composite image. The blending methods described above are now applied "bilaterally" since the problem is symmetric in the source image domains. That is, in the case of image cloning only the cloned part of the composite image is required to be modified during the blending process (although it is also possible to modify the other parts of the image if required). However, in the case of image blending such as in FIG. 4, the parts of the composite image from each source image are modified. The term "bilaterally" is used here to indicate this distinction. A boundary or seam 40 is shown in FIG. 4 in the region of overlap and subdomains of the source regions are then $S'_0$ and $S'_1$ as shown. The boundary or seam is identified in any suitable manner such as by user input or automatic calculation. In the case that automatic calculation is used any suitable algorithm can be used for identifying object edges or outlines in the source images and placing the boundary as close to those edges or outlines as possible.

Figure 5:
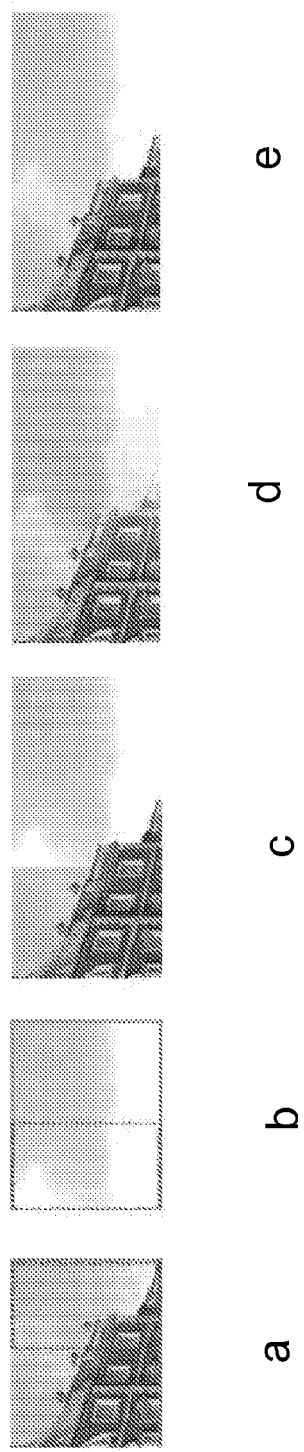
FIG. 5a shows a first source image.
FIG. 5b shows a second source image.
FIG. 5c shows a constructed image formed from the first and second source images of FIGS. 5a and 5b and where this constructed image has been processed using a pre-segmentation algorithm.
FIG. 5d shows the result of a bilateral gradient blending process on the image of FIG. 5c.
FIG. 5e shows the result of an improved image blending process on the image of FIG. 5c.

In one embodiment, a presegmentation boundary is determined which follows object outlines in one or other source image as far as possible. Given partially overlapped images $I_0(r)$ and $I_1(r)$ over domains $S_0$ and $S_1$, the target domain for the blended image pair is $T=S_0 \cup S_1$. First source regions $S'_0 \subset S_0$ and $S'_1 \subset S_1$ are defined, that are mutually exclusive ($S'_0 \cap S'_1 = \emptyset$) and exhaustive ($T=S'_0 \cup S'_1$), over which the method is applied. A common boundary 40 of $S'_0$ and $S'_1$ can then be constructed, for example, by minimizing any suitable contrast dependent functional. This can be computed for example, using the graph cut methods mentioned above. For example, FIG. 5c shows a typical result. FIG. 5a shows a first source image and FIG. 5b a second source image. FIG. 5c shows the result of blending these two source images by a graph cut method such as those mentioned above. The result is poor because an outstanding mismatched seam is present in the composite image. If a "bilateral" Poisson blending is applied to the region of overlap between the two source images discoloration and smearing of object outlines occurs as illustrated in FIG. 5d.

We address these problems by using a "bilateral" form of our functional E(u) as shown below:

$$E(u) = \int_{S_0 \setminus S'_1} (u - I_0)^2 + \lambda^2 w_{S_0}(\nabla I_0)\|\nabla u - \nabla I_0\|^2 + \int_{S_1 \setminus S'_0} (u - I_1)^2 + \lambda^2 w_{S_1}(\nabla I_1)\|\nabla u - \nabla I_1\|^2$$

The weights $wS_0$ and $wS_1$ are defined as before but now over their respective image domains. The method then comprises minimizing E(u) with respect to u, subject to the continuity of u(r), r∈T, and to the boundary conditions $$u(r)=I_0(r), r \in T \setminus S_1 \text{ and } u(r)=I_1(r), r \in T \setminus S_0$$

The result preserves foreground and background colors faithfully, as illustrated in FIG. 5e.

The specification of the functional E(u) has been given above in the continuous domain, for clarity, although it is noted that the minimization of this functional can be carried out numerically over discrete pixel arrays using any suitable known method. For example, finite difference approximation of gradients, gives discrete forms of the unilateral and bilateral method as follows:

$$E = \sum_{p \in \Omega} (u_p - v_p) + \lambda^2 \sum_{(p,q) \in N} w_{pq}(u_p - u_q - v_{pq})^2$$

where p∈Ω are indices of pixels in the domain for E, and N is the set of neighboring pairs of pixels in Ω In the unilateral case, $v_p$ are simply the pixels of $I_S$ and $v_{pq}=v_p-v_q$. In the bilateral case, the domain is segmented as $S_0 \cup S_1$ and the pixels lie in domain $S_0$ or $S_1$, so that $v_p$ are correspondingly pixels of $I_0$ or of $I_1$. Similarly gradients $v_{pq}$ are computed over $I_0$ or over $I_1$, and the only issue is how to define $v_{pq}$ and $w_{pq}$ where pq straddles the segmentation boundary. In those cases we evaluate contrast $|I_p - I_q|$ over both images and use the image with the higher contrast to define $v_{pq}$ and $w_{pq}$. Finally differentiating the equation immediately above with respect to each $u_p$ gives a system of simultaneous linear equations for the optimum $$u_p = v_p - \lambda^2 \sum_{q:(p,q) \in N} w_{pq}(u_p - u_q - v_{pq}), \, p \in \Omega$$

which is sparse. Our results are obtained by sparse Gaussian elimination (MATLAB mldivide) which runs typically in a few seconds over a band of about 30,000 pixels. For greater efficiency multigrid successive over-relaxation (SOR) can be used as known in the art. Note that with SOR, for similar (in fact slightly less) computational cost as computing the method for some value of gradient parameter $\lambda = \lambda_0$, we can obtain results for the whole range of values $0 \leq \lambda \leq \lambda_0$ This is achieved by incrementing $\lambda$ steadily as SOR progresses. It is important because it allows a user to manipulate a graphical user interface slider for $\lambda$ in real-time.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

Although the present examples are described and illustrated herein as being implemented in an image blending system, the system described is provided as an example and not a limitation. As those skilled in the art will appreciate, the present examples are suitable for application in a variety of different types of image processing systems.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by software in machine readable form on a storage medium. This acknowledges that software can be a valuable, separately tradable commodity. It is intended to encompass software, which runs on or controls "dumb" or standard hardware, to carry out the desired functions, (and therefore the software essentially defines the functions of the image blender, and can therefore be termed an image blender, even before it is combined with its standard hardware). For similar reasons, it is also intended to encompass software which "describes" or defines the configuration of hardware, such as HDL (hardware description language) software, as is used for designing silicon chips, or for configuring universal programmable chips, to carry out desired functions.

Any range or device value given herein may be extended or altered without losing the effect sought, as will be apparent to the skilled person.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. One or more computer-readable storage media to store processor executable instructions that, when the instructions are implemented by one or more processors, configure the one or more processors to implement a method comprising:
   combining at least part of a first image and at least part of a second image to form a constructed image;
   identifying a boundary in the constructed image being between a region in the constructed image formed from the first image and a region in the constructed image formed from the second image;
   modifying the constructed image on the basis of the gradient of at least part of either of the first and second images; and
   wherein said modification is also carried out on the basis of one or more of:
      a color preservation term that has an effect in use of controlling a degree of blending between the first and second images; and
      an indication of a degree of contrast in at least one of the first and second images.

2. The one or more computer-readable storage media as claimed in claim 1 wherein at least part of the first image is cloned onto the second image to form the constructed image and wherein the step of modifying the constructed image comprises modifying only the part of the constructed image cloned from the first image.

3. The one or more computer-readable storage media as claimed in claim 1 wherein said first image is a source image and said second image is a source image and those source images are to be blended together to form a composite image.

4. The one or more computer-readable storage media as claimed in claim 1 wherein said modification is substantially equivalent to a minimization of a functional $$E(u) = \int_S (u - I_S)^2 + \lambda^2 \|\nabla u - \nabla I_S\|^2.$$

subject to boundary conditions and where u represents the constructed image, $I_S$ represents a source image and $\lambda$ is a weighting parameter.

5. The one or more computer-readable storage media as claimed in claim 1 wherein a weighting parameter is used to control a trade off between modification on the basis of the color preservation term and the modification on the basis of the gradient.

6. The one or more computer-readable storage media as claimed in claim 5 which further comprises receiving user input specifying a value for said weighting parameter.

7. The one or more computer-readable storage media as claimed in claim 6 which further comprises receiving user input specifying an ordered sequence of values for said weighting parameter.

8. The one or more computer-readable storage media as claimed in claim 7 which further comprises:
   recomputing said constructed image on the basis of the ordered sequence of values for the weighting parameter; and
   outputting said recomputed constructed images to a display in real time.

9. The one or more computer-readable storage media as claimed in claim 7 wherein said user input is received via a graphical user interface comprising a sliding graphical input tool.

10. The one or more computer-readable storage media as claimed in claim 1 wherein said indication of a degree of contrast in the source image acts to detect the absence of edges such that in use, the modification is arranged to preserve absence of edges in the constructed image.

11. The one or more computer-readable storage media as claimed in claim 1 wherein said modification on the basis of an indication of the degree of contrast comprises using a fragility term.

12. The one or more computer-readable storage media as claimed in claim 1 wherein said boundary is identified as a result of user input.

13. The one or more computer-readable storage media as claimed in claim 1 wherein said boundary is identified as a result of automatic segmentation computation.

14. The one or more computer-readable storage media as claimed in claim 13 wherein said automatic segmentation computation comprises a graph cut method.

15. The one or more computer-readable storage media as claimed in claim 3 wherein said source images are arranged to partially overlap and wherein said boundary is within the region of overlap between those images.

16. The one or more computer-readable storage media as claimed in claim 4 wherein said minimization is carried out using a numerical method based on finite difference approximation of gradients.

17. An apparatus for blending a first image and a second image to form a constructed image, said apparatus comprising:
   an image combiner arranged to combine at least part of the first image and at least part of the second image to form the constructed image;
   a processor arranged to identify a boundary in the constructed image being between a region in the constructed image formed from the first image and a region in the constructed image formed from the second image;
   an image processor arranged to modify the constructed image on the basis of the gradient of at least part of either of the first and second images; and wherein said image processor is further arranged to modify the constructed image on the basis of one or more of: a color preservation term that has an effect in use of controlling a degree of blending between the first and second images and an indication of a degree of contrast in at least one of the first and second images.

18. An apparatus as claimed in claim 17 wherein said processor is arranged to receive user input identifying said boundary.

* * * * *